US006881937B2

(12) United States Patent
Swiontek

(10) Patent No.: US 6,881,937 B2
(45) Date of Patent: Apr. 19, 2005

(54) THERMOFORMED FOOD CONTAINERS WITH ENHANCED RIGIDITY

(75) Inventor: Anthony J. Swiontek, Neenah, WI (US)

(73) Assignee: Fort James Corporation, Atlanta, GA (US)

( * ) Notice: Subject to any disclaimer, the term of this patent is extended or adjusted under 35 U.S.C. 154(b) by 26 days.

(21) Appl. No.: 10/387,093

(22) Filed: Mar. 12, 2003

(65) Prior Publication Data

US 2003/0178431 A1 Sep. 25, 2003

Related U.S. Application Data

(60) Provisional application No. 60/366,790, filed on Mar. 22, 2002.

(51) Int. Cl.[7] .................................................. H05B 6/80
(52) U.S. Cl. ........................ 219/725; 219/730; 428/328
(58) Field of Search ................................ 219/725, 730; 428/321, 36.7, 308.4, 95

(56) References Cited

U.S. PATENT DOCUMENTS

| 5,023,286 | A | | 6/1991 | Abe et al. | |
| 6,203,893 | B1 | | 3/2001 | Nohara et al. | 428/213 |
| 6,420,689 | B1 | * | 7/2002 | Cochran et al. | 219/725 |
| 6,459,075 | B1 | * | 10/2002 | McCarthy et al. | 219/725 |

FOREIGN PATENT DOCUMENTS

| JP | 53-84044 | 12/1976 | ........... C08L/23/12 |
| JP | 59-209520 | 5/1983 | ............ B65D/1/00 |
| WO | WO 99/48775 | 9/1999 | ........... B65D/85/00 |

OTHER PUBLICATIONS

Database WPI, Section Ch, Week 198603, Derwent Publications Ltd., London, GB; AN 1986–016517; XP002246036 & JP 60 238341 A (Idemitsu Petrochem Co), Nov. 27, 1985 & Patent Abstracts of Japan, vol. 010, No. 107 (C–341), Apr. 22, 1986 & JP 60 238341 A.

Database WPI, Section Ch, Week 199332, Derwent Publications Ltd., London, GB; AN 1993–252899; XP002246037 & JP 05 170985 A (Sekisui Chem Ind Co Ltd), Jul. 9, 1993.

* cited by examiner

Primary Examiner—Joseph Man-Fu Moy
(74) Attorney, Agent, or Firm—Michael W. Ferrell

(57) ABSTRACT

A thermoformed disposable food container having a wall caliper of from about 10 to about 80 mils consisting essentially of from about 30 to about 80 percent by weight of a matrix polymer composition consisting predominantly of a polypropylene polymer and optionally including a polyethylene polymer, from about 10 to about 50 percent mica, from about 2.5 to about 25 percent calcium carbonate, and up to about 5 weight percent titanium dioxide, exhibits enhanced rigidity when the calcium carbonate has a mean particle size of less than about 8 microns. The extrudable compositions are likewise useful for film, sheet and injection molding applications.

20 Claims, 4 Drawing Sheets

Table 1 — General Observations

Properties of 11" thermoformed plates made from sheet composed of:

| Polypropylene | 52% |
| Mica | 30% |
| Calcium Carbonate | 10% |
| HDPE | 5% |
| $TiO_2$ + color | 3% |

|  | Case 1 | Case 2 | Case 3 |
|---|---|---|---|
| Product Weight | 33.4 | 32.5 | 33.15 |
| Calcium Carbonate Particle Size (Microns) | 12 | 6 | 1 |
| GM SSI Rigidity | 367 | 416 | 452 |
| Normalized Rigidity g/g | 11.0 | 12.8 | 13.63 |

THERMOFORMED FOOD CONTAINERS WITH ENHANCED RIGIDITY

CLAIM FOR PRIORITY

This non-provisional application claims the benefit of the filing date of U.S. Provisional Patent Application Ser. No. 60/366,790, of the same title, filed Mar. 22, 2002.

TECHNICAL FIELD

The present invention relates generally to disposable plates, bowls, platters and the like and more particularly to plastic articles of this class produced by thermoforming. The articles of the invention are thermoformed from extruded plastic sheet stock which is mineral-filled with a combination of mica and calcium carbonate.

BACKGROUND

Disposable food containers are well known in the art. Typically, such containers are made from paper or plastic.

Pressed paperboard containers may be made as noted in one or more of U.S. Pat. No. 4,606,496 entitled "Rigid Paperboard Container" of R. P. Marx et al; U.S. Pat. No. 4,609,140 entitled "Rigid Paperboard Container and Method and Apparatus for Producing Same" of G. J. Van Handel et al; U.S. Pat. No. 4,721,499 entitled "Method of Producing a Rigid Paperboard Container" of R. P. Marx et al; U.S. Pat. No. 4,721,500 entitled "Method of Forming a Rigid Paper-Board Container" of G. J. Van Handel et al; and U.S. Pat. No. 5,203,491 entitled "Bake-In Press-Formed Container" of R. P. Marx et al. Equipment and methods for making paperboard containers are also disclosed in U.S. Pat. No. 4,781,566 entitled "Apparatus and Related Method for Aligning Irregular Blanks Relative to a Die Half" of A. F. Rossi et al; U.S. Pat. No. 4,832,676 entitled "Method and Apparatus for Forming Paperboard Containers" of A. D. Johns et al; and U.S. Pat. No. 5,249,946 entitled "Plate Forming Die Set" of R. P. Marx et al.

Thermoformed plastic containers, particularly polypropylene mica-filled containers with a micronodular surface are disclosed in U.S. Pat. No. 6,100,512 to Neculescu et al. Such containers have the advantages that they are durable and may be washed and re-used if so desired and are microwaveable. The disclosure of the foregoing patents is incorporated by reference.

A drawback of plastic thermoformed containers is that they tend to be more costly than their paper counterparts due, in part, to material costs. More rigid materials can be used more sparingly and are thus highly desirable in the field. One way to increase rigidity of polypropylene containers is to use a filler such as mica as disclosed in the '512 patent. However, mica tends to interact with polypropylene to produce undesirable odors, believed to be caused by certain organic ketone compounds generated during melt-processing of the material. The generation of odors is minimized by including a basic inorganic compound, such as calcium carbonate in the composition.

It has been unexpectedly found that fine grades of calcium carbonate can greatly increase the rigidity of polypropylene containers filled with calcium carbonate and mica as described hereinafter.

SUMMARY OF INVENTION

Disposable polypropylene containers made from extruded polypropylene mica and calcium carbonate filled sheet exhibits enhanced rigidity when fine grades of calcium carbonate are used. An added advantage is that the sheet filled with finer calcium carbonate exhibits less die lip buildup as it is produced. For 11" plates, normalized rigidity was observed to increase from 11 g/g to 12.8 g/g when the mean particle size of calcium carbonate used was changed from 12 to 6 microns. A further increase to 13.63 g/g of normalized rigidity was achieved when calcium carbonate with a mean particle size of 1 micron was used.

There is thus provided in accordance with the present invention a thermoformed disposable food container having a wall caliper of from about 10 to about 80 mils consisting essentially of from about 30 to about 80 percent by weight of a matrix polymer composition consisting predominantly of a polypropylene polymer and optionally including a polyethylene polymer, from about 10 to about 50 percent mica, from about 2.5 to about 25 percent calcium carbonate, and up to about 5 weight percent titanium dioxide, wherein the calcium carbonate has a mean particle size of less than about 8 microns. More preferably the calcium carbonate has a mean particle size of 6 microns or less; yet more preferably less than about 5 microns, and still more preferably the calcium carbonate has a mean particle size of less than about 3 or 2.5 microns. In some preferred embodiments, the calcium carbonate has a mean particle size of about 1 micron or less.

Particularly preferred embodiments include those wherein the mean particle size of the calcium carbonate is about 6 microns; those in which the mean particle size of the calcium carbonate is about 3 microns; and those wherein the mean particle size of the calcium carbonate is about 1 micron.

In other aspects of the invention, there are provided extrudable and injection moldable compositions having the same components in like proportions as the disposable food containers. These compositions may be in the form of pellets, for example, or extruded into sheet or film form or injection molded into useful articles. Here again, the compositions thus have a calcium carbonate content of from about 2.5 weight percent to about 25 weight percent calcium carbonate and so forth. Particularly preferred compositions include those wherein the calcium carbonate has a mean particle size of 6 microns; those wherein the calcium carbonate has a mean particle size of 3 microns; and those wherein the calcium carbonate has a mean particle size of about 1 micron.

Typically, the calcium carbonate is present in an amount of from about 5 to about 15 percent by weight of the container, whereas mica is present in an amount of from about 20 to about 40 percent by weight of the container. The matrix polymer composition generally consists of a polypropylene polymer and a polyethylene polymer in preferred cases. The polyethylene polymer may be present in an amount of from about 1 to about 15 percent by weight of the container, typically present in an amount of from 2.5 to about 7.5 percent by weight. A preferred polyethylene polymer is HDPE.

The polypropylene polymer is typically present in an amount of from about 40 to about 60 percent by weight of the container, and may be isotactic polypropylene. Optionally included is titanium dioxide typically in an amount of from about 0.5 to about 4 percent by weight of the container.

The containers may have a wall caliper of from about 10 to about 50 mils, typically from about 15 to about 25 mils.

These and other aspects of the invention will be further appreciated from the following description, drawings and claims.

BRIEF DESCRIPTION OF DRAWINGS

The invention is described in detail below with reference to the various drawings. In the drawings.

DETAILED DESCRIPTION

Figure 1:
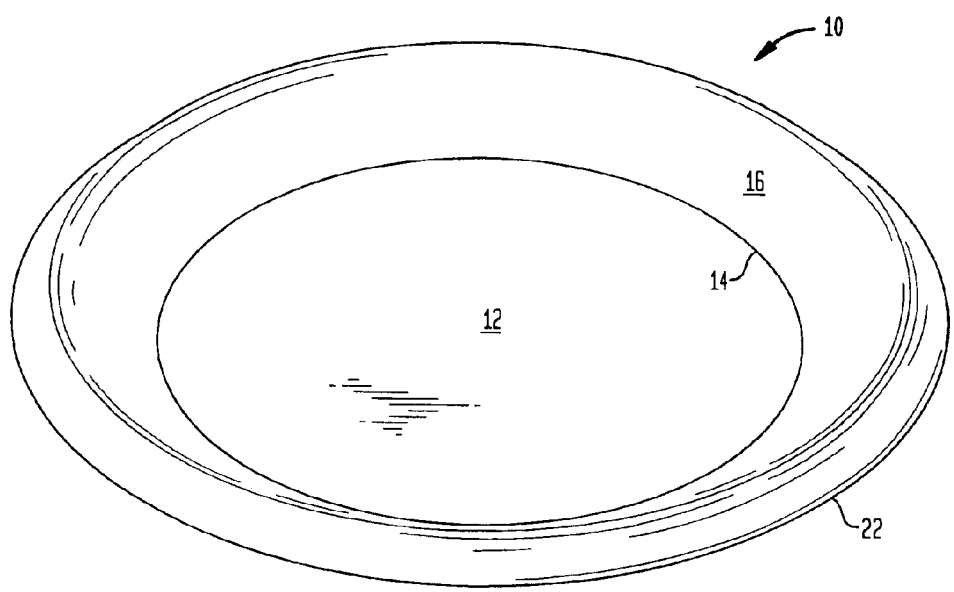
FIG. 1 is a view in perspective of a plate constructed in accordance with the present invention.

The invention is described in detail below with reference to the figures. Such description is for purposes of illustration only and is not limitative of the invention in any way.

Numerous modifications within the spirit and scope of the present invention, set forth in the appended claims, will be readily apparent to those of skill in the art.

Generally speaking, the present invention is directed to the discovery that using calcium carbonate having a mean particle size of less than 12 microns is beneficial when making polypropylene food containers from polypropylene sheet filled with mica and calcium carbonate. The smaller particle size calcium carbonate has a beneficial effect on container rigidity making it possible to use less material for a given container and also appears to reduce die lip build up during sheet extrusion. A composition with six (6) micron mean size calcium carbonate extruded into sheet extruded well with less die lip build up (about 5/16" vs. about 3/8") than a composition with twelve (12) micron mean particle size calcium carbonate. Still less die lip build up (about 3/16") was observed when a calcium carbonate having a mean particle size of one (1) micron was used in corresponding compositions.

Containers formed from the sheet had the properties summarized in Table 1 below.

TABLE 1

General Observations

Properties of 11" thermoformed plates made from sheet composed of:

| | | |
|---|---|---|
| Polypropylene | 52% | |
| Mica | 30% | |
| Calcium Carbonate | 10% | |
| HDPE | 5% | |
| TIO$_2$ + color | 3% | |

| | Case 1 | Case 2 | Case 3 |
|---|---|---|---|
| Product Weight | 33.4 | 32.5 | 33.15 |
| Calcium Carbonate Particle Size (Microns) | 12 | 6 | 1 |
| GM SSI Rigidity | 367 | 416 | 452 |
| Normalized Rigidity g/g | 11.0 | 12.8 | 13.63 |

As can be seen, product rigidity increases markedly as the particle size of the calcium carbonate is reduced. This discovery makes it possible to make a more rigid product with the same amount of material or maintain a target rigidity while reducing material consumption.

The foregoing is described and illustrated further below.
Test Methods, Definitions and Materials SSI Rigidity is measured with the Single Service Institute Plate Rigidity Tester of the type originally available through Single Service Institute, 1025 Connecticut Ave., N.W., Washington, D.C. The SSI Rigidity test apparatus has been manufactured and sold through Sherwood Tool, Inc. Kensington, Conn. This test is designed to measure the rigidity (i.e., resistance to buckling and bending) of paper and plastic plates, bowls, dishes, and trays by measuring the force required to deflect the rim of these products a distance of 0.5 inch while the product is supported at its geometric center. Specifically, the plate specimen is restrained by an adjustable bar on one side and is center supported. The rim or flange side opposite to the restrained side is subjected to 0.5 inch deflection by means of a motorized cam assembly equipped with a load cell, and the force (grams) is recorded. The test simulates in many respects the performance of a container as it is held in the hand of a consumer, supporting the weight of the container's contents. SSI Rigidity is expressed as grams per 0.5 inch deflection. A higher SSI value is desirable since this indicates a more rigid product. All measurements were done at standard TAPPI conditions for paperboard testing, 72° F. and 50% relative humidity. Geometric mean averages for the machine direction (MD) and cross machine direction (CD) are reported herein.

The particular apparatus employed for SSI Rigidity measurements was a Model No. ML-4431-2 SSI Rigidity tester as modified by Georgia Pacific Corporation, National Quality Assurance Lab, Lehigh Valley Plant, Easton, Pa. 18040 using a Chatillon gauge available from Chatillon, Force Measurements Division, P.O. Box 35668, Greensboro, N.C. 27425-5668.

Unless otherwise specified, the following terms have the following meanings:

"Rigidity" refers to SSI Rigidity (kilograms or grams/0.5 inches).

"Sheet", "sheet stock" and the like refers to both a web or roll of material and to material that is cut into sheet form for processing.

Particle size refers to mean particle size.

Mean particle size of a particulate material such as calcium carbonate is the particle diameter as to which 50 percent by weight of the particles of the particulate material have a smaller diameter. This quantity may be determined by any suitable technique.

Unless otherwise indicated, "mil", "mils" and like terminology refers to thousandths of an inch and dimensions appear in inches. Likewise, caliper is the thickness of material and is expressed in mils unless otherwise specified.

The term major component, predominant component and the like refers to a component making up at least about 50% of a composition or that class of compound in the composition by weight as the context indicates; for example, a filler is the predominant filler in a filled plastic composition if it makes up more than about 50% by weight of the filler in the composition based on the combined weight of fillers in the composition, and a resin is the predominant resin in a composition if it makes up more than 50 percent of the resin in the composition.

Basis weights appear in lbs per 3000 square foot ream unless otherwise indicated.

Percents refer to weight percents.

Polypropylene polymers which are suitable are preferably selected from the group consisting of isotactic polypropylene, and copolymers of propylene and ethylene wherein the ethylene moiety is less than about 10% of the units making up the polymer, and mixtures thereof. Generally, such polymers have a melt flow index from about 0.3 to about 4, but most preferably the polymer is isotactic polypropylene with a melt-flow index of about 1.5.

A polyethylene polymer or component may be any suitable polyethylene such as HDPE, LDPE, MDPE, LLDPE or mixtures thereof and may be melt-blended with polypropylene if so desired. The various polyethylene polymers referred to herein are described at length in the *Encyclopedia of polymer Science & Engineering* (2d Ed.), Vol. 6; pp:

383–522, Wiley 1986; the disclosure of which is incorporated herein by reference. HDPE refers to high density polyethylene which is substantially linear and has a density of generally greater that 0.94 up to about 0.97 g/cc. LDPE refers to low density polyethylene which is characterized by relatively long chain branching and a density of about 0.912 to about 0.925 g/cc. LLDPE or linear low density polyethylene is characterized by short chain branching and a density of from about 0.92 to about 0.94 g/cc. Finally, intermediate density polyethylene (MDPE) is characterized by relatively low branching and a density of from about 0.925 to about 0.94 g/cc.

"Thermoforming", "thermoformed" and like terminology is given its ordinary meaning. In the simplest form, thermoforming is the draping of a softened sheet over a shaped mold. In the more advanced form, thermoforming is the automatic high speed positioning of a sheet having an accurately controlled temperature into a pneumatically actuated forming station whereby the article's shape is defined by the mold, followed by trimming and regrind collection as is well known in the art. Still other alternative arrangements include the use of drape, vacuum, pressure, free blowing, matched die, billow drape, vacuum snap-back, billow vacuum, plug assist vacuum, reverse draw with plug assist, pressure bubble immersion, trapped sheet, slip, diaphragm, twin-sheet cut sheet, twin-sheet roll-fed forming or any suitable combinations of the above. Details are provided in J. L. Throne's book, *Thermoforming*, published in 1987 by Coulthard. Pages 21 through 29 of that book are incorporated herein by reference. Suitable alternate arrangements also include a pillow forming technique which creates a positive air pressure between two heat softened sheets to inflate them against a clamped male/female mold system to produce a hollow product. Metal molds are etched with patterns ranging from fine to coarse in order to simulate a natural or grain like texturized look. Suitable formed articles are trimmed in line with a cutting die and regrind is optionally reused since the material is thermoplastic in nature. Other arrangements for productivity enhancements include the simultaneous forming of multiple articles with multiple dies in order to maximize throughput and minimize scrap. In some preferred embodiments, the melt-compounded composition from which the articles are made may include polypropylene and optionally further includes a polyethylene component and titanium dioxide. Suitable materials and techniques for fabricating the disposable containers of the present invention from thermoplastic materials appear in U.S. Pat. No. 6,211,501 to McCarthy et al. as well as U.S. Pat. No. 6,211,500 to Cochran II et al. the disclosures of which are incorporated herein by reference.

Preferred Embodiments

In general, products of the invention are made by first extruding a polypropylene sheet of suitable composition as described in the '500 and '501 patents followed by thermoforming the sheet as is also described in the '500 and '501 patents. A suitable container shape is that described in U.S. Co-Pending application Ser. No. 09/603,579, filed Jun. 26, 2000, entitled "Smooth Profiled Food Service Articles". These plates have the characteristics seen in FIGS. 1–3 below and in Tables 2–4.

Figure 2:
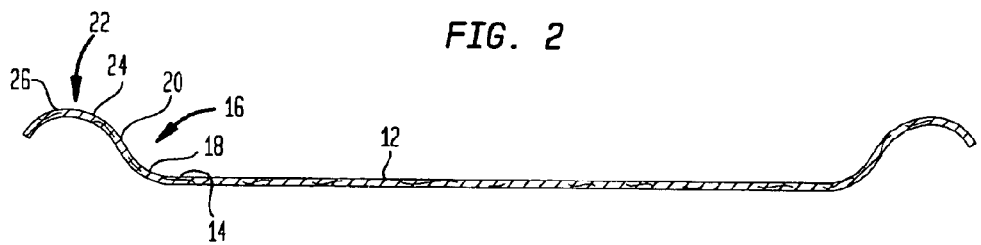
FIG. 2 is a view in cross-section and elevation of the plate of FIG. 1 illustrating the profile of the plate.
Figure 3:
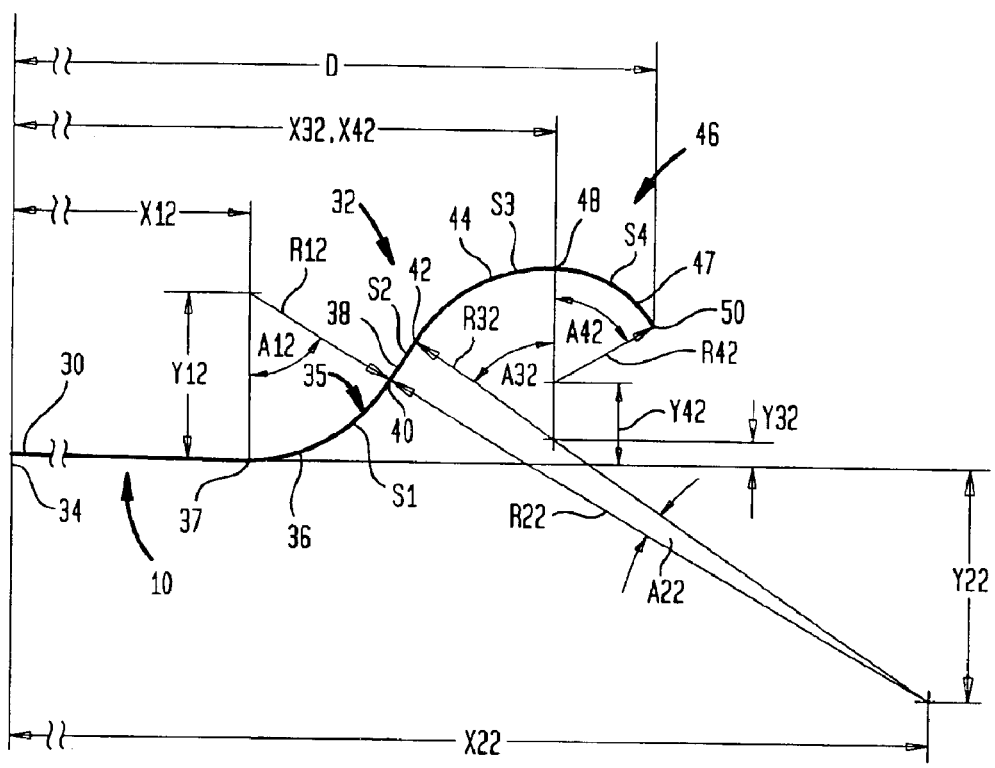
FIG. 3 is a schematic diagram illustrating the profile of the plate of FIGS. 1 and 2.

Illustrated in FIGS. 1 through 3, there is a plate 10 which includes a planar center 12 which, in turn, includes an outer peripheral surface 14. This center region 12 may have a slight convex crown to improve plate stability during use. The planar center 12 forms a bottom for the plate 10. An outwardly projecting sidewall 16 includes a first rim portion 18 which is joined to the outer peripheral surface 14 of the planar center 12. A second rim portion 20 is joined to the first rim portion 18. The first rim portion 18 and the second rim portion 20 form the outwardly projecting sidewall 16 which forms the sidewall of the plate 10. A rim 22 includes a third rim portion 24 which is joined to the second rim portion 20 of the outwardly projecting sidewall 16. A fourth rim portion 26 is joined to the third rim portion 24. The fourth rim portion 26 forms the outer edge of the plate 10.

FIG. 3 illustrates a partial cross-sectional view of a plate, diameter D, according to the present invention. The plate 10 defines a center line 34. A base or bottom-forming portion 30 extends from the center line 34 to an outer peripheral portion 32.

From the center line 34 a predetermined distance X12 extends toward the outer peripheral surface forming portion 32. A distance Y12 extends a predetermined distance from the base or bottom-forming portion 30 upwardly therefrom. A radius R12 extends from the intersection point of the distance X12 and Y12 to form a first rim portion 36 of the outwardly projecting sidewall 35. The first rim portion 36 is defined by an arc A12 which extends from a substantially vertical line defined at an outer peripheral point 37 to a fixed point 40. The arc A12 may be approximately 60°.

A distance X22 extends from the center line 34 to a predetermined point. A distance Y22 extends from the base or bottom-forming portion 30 of the plate 10 downwardly a predetermined distance. A radius R22 extends from the intersection of the lines X22 and Y22 to define the radius of curvature of a second rim portion 38 of the sidewall 35. The radius R22 extends from the first fixed point 40 to the second fixed point 42 through an arc A22. The arc A22 may be approximately 4°.

A distance X32 extends from the center line 34 to a predetermined distance. A distance Y32 extends from the base or bottom-forming section 30 of the plate 10 to project upwardly a predetermined distance. A radius R32 extends from the intersection of the lines X32 and Y32 which is the radius of the third rim portion 44 of the rim 46. The radius R32 extends from the second fixed point 42 to a third fixed point 48. An arc A32 is formed between the second fixed point 44 and the third fixed point 48 to extend a predetermined distance. The arc A32 may be approximately 55°.

A distance X42 extends a predetermined distance from the center line 34. Similarly, a distance Y42 extends from the base or bottom-forming section 30 of the plate 10 to project upwardly. A radius R42 extends from the intersection of the lines X42 and Y42 to define the radius of curvature of a fourth rim portion 47 of the rim 46. An arc A42 is formed between the third fixed point 48 and a fourth fixed point 50 at diameter D from the center line. The arc A42 may be approximately 60°. A section disposed at 50 forms the outer edge of the plate.

The article made according to the present invention may have any particular size or shape. In various embodiments of the present invention the container may be a 9" or 11" plate with profile coordinates as illustrated in FIGS. 1 through 3 having the dimensions, angles, or relative dimensions enumerated in Tables 2 through 4.

TABLE 2

Dimensions and Angles For 9" Plate

| DIMENSION and ANGLES | VALUE (inches or degrees) |
|---|---|
| R12 | 0.537 |
| X12 | 3.156 |
| Y12 | 0.537 |
| R22 | 2.057 |
| X22 | 5.402 |
| Y22 | 0.760 |
| R32 | 0.564 |
| X32 | 4.167 |
| Y32 | 0.079 |
| R42 | 0.385 |

TABLE 2-continued

Dimensions and Angles For 9" Plate

| DIMENSION and ANGLES | VALUE (inches or degrees) |
| --- | --- |
| X42 | 4.167 |
| Y42 | 0.258 |
| A12 | 60.00° |
| A22 | 4.19° |
| A32 | 55.81° |
| A42 | 60.00° |
| D | 9.00 |
| BOTTOM CONVEX CROWN | 0.06 |

TABLE 3

Dimensions and Angles For 11' PLATE

| DIMENSION/ANGLES | VALUE (inches or degrees) |
| --- | --- |
| R12 | 0.656 |
| X12 | 3.857 |
| Y12 | 0.656 |
| R22 | 2.514 |
| X22 | 6.602 |
| Y22 | 0.929 |
| R32 | 0.689 |
| X32 | 5.093 |
| Y32 | 0.097 |
| R42 | 0.470 |
| X42 | 5.093 |
| Y42 | 0.315 |
| A12 | 60.00° |
| A22 | 4.19° |
| A32 | 55.81° |
| A42 | 60.00° |
| D | 11.00 |
| BOTTOM CONVEX CROWN | 0.06 |

TABLE 4

Dimensions For 9" and 11" PLATES

| DIMENSION RATIO OR ANGLE | VALUES (Dimensionless or degrees) | | |
| --- | --- | --- | --- |
|  | PREFERRED | MINIMUM | MAXIMUM |
| R12/D | 0.060 | 0.045 | 0.075 |
| X12/D | 0.351 | 0.280 | 0.420 |
| Y12/D | 0.060 | 0.045 | 0.075 |
| R22/D | 0.228 | 0.180 | 0.275 |
| X22/D | 0.600 | 0.480 | 0.720 |
| Y22/D | 0.084 | 0.065 | 0.100 |
| R32/D | 0.063 | 0.050 | 0.075 |
| X32/D | 0.463 | 0.370 | 0.555 |
| Y32/D | 0.009 | 0.007 | 0.011 |
| R42/D | 0.043 | 0.034 | 0.052 |
| X42/D | 0.463 | 0.370 | 0.555 |
| Y42/D | 0.029 | 0.023 | 0.035 |
| A12 | 60.00° | 55.00° | 75.00° |
| A22 | 4.19° | 1.00° | 10.00° |
| A32 | 55.81° | 45.00° | 75.00° |
| A42 | 60.00° | 45.00° | 75.00° |

Salient features of the plate illustrated in FIGS. 1 through 3 generally include a substantially planar center portion (which may be crowned as noted above and illustrated throughout the various figures) with four adjacent rim portions extending outwardly therefrom, each rim portion defining a radius of curvature as set forth above and further noted below. The first rim portion extends outwardly from the planar center portion and is convex upwardly as shown. There is defined by the plate a first arc A12 with a first radius of curvature R12 wherein the arc has a length S1. A second rim portion is joined to the first rim portion and is downwardly convex, defining a second arc A22, with a radius of curvature R22 and a length S2. A third, downwardly convex, rim portion is joined to the second rim portion and defines another arc A32. There is defined a third radius of curvature R32 and a third arc length S3. A tangent to the third arc at the upper portion thereof is substantially parallel to the planer center portion as shown in FIG. 2. A fourth rim portion is joined to the third rim portion, which is also downwardly convex. The fourth rim portion defines a fourth arc A42 with a length S4, with a radius of curvature R42.

The length of the second arc, S2 is generally less the length of the fourth arc S4, which, in turn, is less than the length S1 of the first arc A12. The radius of curvature R42 of the fourth arc is less than the radius of curvature R32 of the third rim portion, which in turn, is less than radius of curvature R22 of the second rim portion. The angle of the first arc, A12 is generally greater that about 55 degrees, while, the angle of the third arc, A32 is generally greater than about 45 degrees as is set forth in the foregoing tables. The angle of the fourth arc A42 is generally less than about 75 degrees and more preferably is about 60 degrees.

Typically, the length S1 of arc A12 is equivalent to the length S3 of arc A32 and R12 of the first rim portion is equivalent in length to the radius of curvature R32 of the third rim portion.

Generally speaking, the height of the center of curvature of the first arc (that is the origin of ray R12) above the central planar portion is substantially less than, perhaps twenty five percent or so less than, the distance that the center of curvature of the second rim portion (the origin of ray R22) is below the central planar portion. In other words, the length Y12 is about 0.75 times or less the length Y22.

So also, the horizontal displacement of the center of curvature of the second rim portion from the center of curvature of the first rim portion is at least about twice the length of the first radius of curvature R12. The height of the center of curvature of the third rim portion above the central planar portion is generally less than the height of the center of curvature of the fourth rim portion above the plane of the central planar portion. The horizontal displacement of the center of curvature of the second rim portion is generally outwardly disposed from the center of curvature of the third and fourth rim portions. A further noteworthy feature of the plate of FIGS. 1 through 3 is that the height of the center of curvature of the third rim portion above the planar central portion is less than about 0.3 times the radius of curvature R42 of the fourth rim portion; while the height of the center of curvature of the fourth rim portion above the plane of the central portion is at least about 0.4 times the first radius of curvature R12.

Specific Examples

A series of 11" plates described generally above were thermoformed from extruded sheet having the following composition:

| Component | Wt. Percent |
| --- | --- |
| Polypropylene | 52 |
| Mica | 30 |
| Calcium Carbonate | 10 |
| HDPE | 5 |
| TiO$_2$ + color | 3 |

Basis weights of sheet material used were from 255 to 315 lbs/3000 square foot ream and 3 different types of particulate calcium carbonate were used: 12 micron mean particle size material, 1 micron mean particle size material (Lot A) and another 1 micron mean particle size material (Lot B). The one micron material is available from Imerys as supermite calcium carbonate. Six micron material, available from Omya, called Omya 5, has an average particle size of about 6 microns and may likewise be employed. The mica may have a mean particle size of 50 microns or so.

Figure 4:
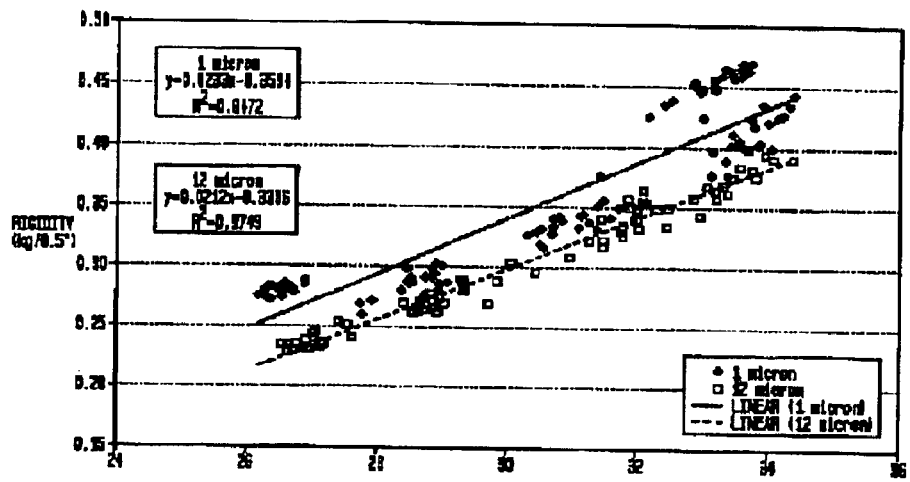
FIG. 4 is a plot of SSI Rigidity versus product weight for 11" mica-filled polypropylene plates containing 1 micron and 12 micron mean particle size calcium carbonate showing numerous runs.
Figure 5:
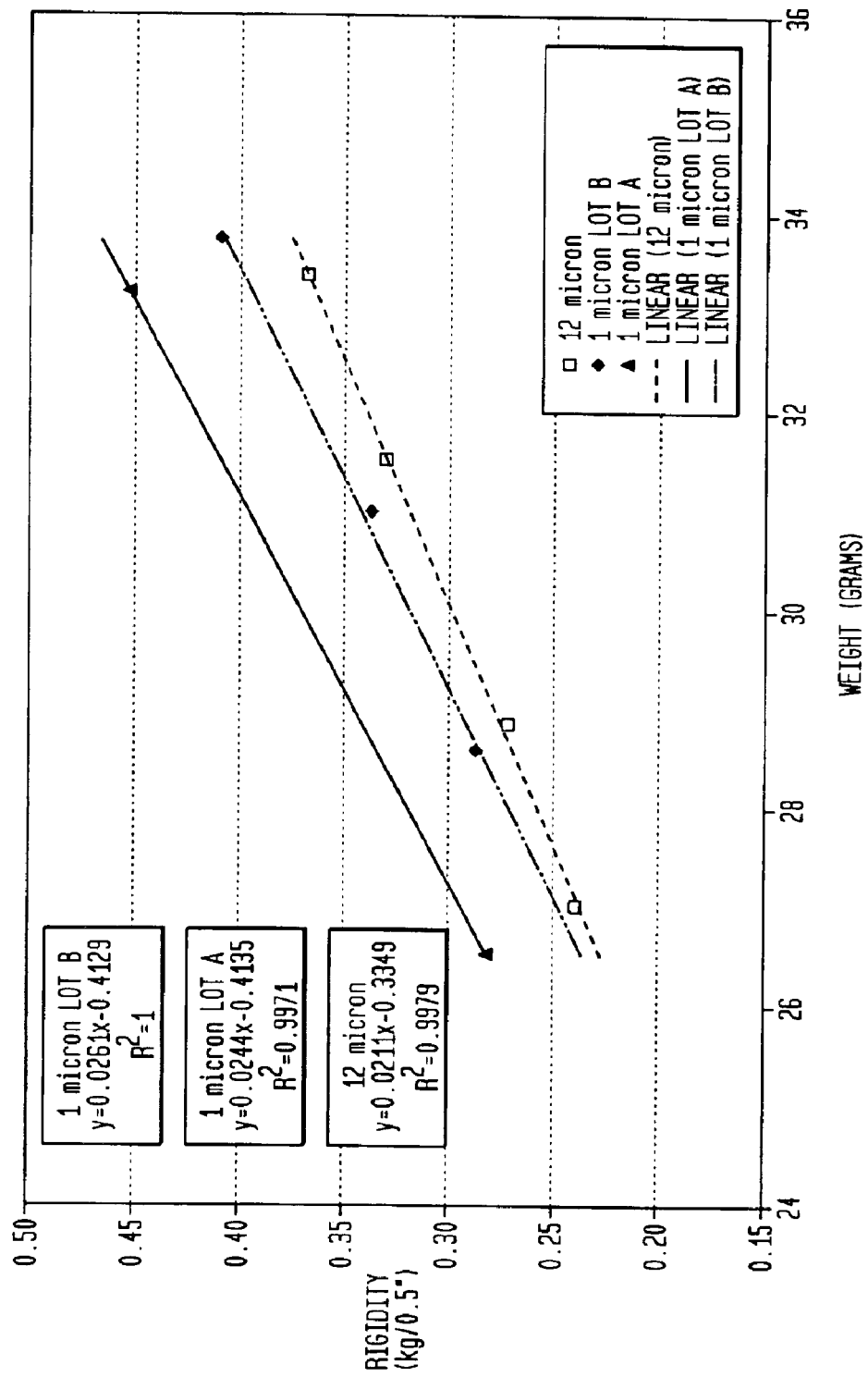
FIG. 5 is a plot of average SSI Rigidity versus average product weight for 11" mica-filled polypropylene plates containing particles from different lots of 1 micron mean particle size calcium carbonate and 12 micron mean particle size calcium carbonate.

Results are summarized in Table 5 below and appear graphically in FIGS. 4 and 5 which are plots of SSI Rigidity versus product weights, that is, the weight of the plate. As can be seen, products made with the 1 micron calcium carbonate exhibited consistently higher rigidity levels at all weights, whereas products with the Lot A 1 micron mean size material exhibited a remarkable increase in rigidity at all weights tested.

TABLE 5

SSI Rigidity for 11" Thermoformed Mica/Calcium Carbonate-Filled Polypropylene Plates

| Example Series | Nominal Basis Weight (lbs) | Mean CaCO$_3$ Particle Size (Microns)/Lot | Average Product Weight (grams) | Average SSI GM Rigidity (grams) |
|---|---|---|---|---|
| A | 315 | 12 | 33.4 | 367 |
| 1 | 315 | 1/A | 33.15 | 452 |
| 2 | 315 | 1/B | 33.7 | 409 |
| B | 295 | 12 | 31.5 | 330 |
| 3 | 295 | 1/B | 31 | 337 |
| C | 275 | 12 | 28.9 | 270 |
| 4 | 275 | 1/B | 28.6 | 286 |
| D | 255 | 12 | 27.1 | 237 |
| 5 | 255 | 1/A | 26.6 | 280 |

The invention has been described in detail hereinabove in connection with numerous embodiments. That discussion is not intended to limit in any way the scope of the present invention which is defined in the appended claims. It will be readily appreciated by one of skill in the art that the particular embodiments illustrated may be scaled up or down in size with the relative proportions shown herein or that product shapes such as square or rectangular with rounded corners, triangular, multi-sided, oval platters, polygonal platters with rounded corners and the like may be formed in accordance with the present invention. Typical products include plates, bowls, trays, deep dish containers, platters and so forth.

What is claimed is:

1. A thermoformed disposable food container having a wall caliper of from about 10 about 80 mils consisting essentially of from about 30 to about 80 percent by weight of a matrix polymer composition consisting predominantly of a polypropylene polymer and including from about 10 to about 50 percent mica, from about 2.5 to about 25 percent calcium carbonate, and up to about 5 weight percent titanium dioxide wherein the calcium carbonate has a mean particle size of less than about 8 microns, the composition optionally further including a polyethylene polymer.

2. The thermoformed disposable food container according to claim 1, wherein the calcium carbonate has a mean particle size of about 6 microns or less.

3. The thermoformed disposable food container according to claim 2, wherein the calcium carbonate has a mean particle size of less than about 5 microns.

4. The thermoformed disposable food container according to claim 3, wherein the calcium carbonate has a mean particle size of about 3 microns or less.

5. The thermoformed disposable food container according to claim 4, wherein the calcium carbonate has a mean particle size of less than about 2.5 microns.

6. The thermoformed disposable food container according to claim 5, wherein the calcium carbonate has a mean particle size of about 1 micron or less.

7. The thermoformed disposable food container according to claim 1, wherein calcium carbonate is present in an amount of from about 5 to about 15 percent by weight of said container.

8. The thermoformed disposable food container according to claim 1, wherein mica is present in an amount of from about 20 to about 40 percent by weight of said container.

9. The thermoformed disposable food container according to claim 1, wherein said matrix polymer composition consists of a polypropylene polymer and a polyethylene polymer.

10. The thermoformed disposable food container according to claim 9, wherein said polyethylene polymer is present in an amount of from about 1 to about 15 percent by weight of said container.

11. The thermoformed disposable food container according to claim 10, wherein said polyethylene polymer composition is present in an amount of from about 2.5 to about 7.5 percent by weight of said container.

12. The thermoformed disposable food container according to claim 11, wherein said polyethylene polymer is HDPE.

13. The thermoformed disposable food container according to claim 9, wherein said polypropylene polymer is present in an amount of from about 40 to about 60 percent by weight of said container.

14. The thermoformed disposable food container according to claim 13, wherein said polypropylene polymer is isotactic polypropylene.

15. The thermoformed disposable food container according to claim 10, wherein titanium dioxide is present in an amount of from about 0.5 to about 4 percent by weight of said container.

16. The thermoformed disposable food container according to claim 1, having a wall caliper of from about 10 to about 50 mils.

17. The thermoformed disposable food container according to claim 16, having a wall caliper of from about 15 to about 25 mils.

18. A thermoformed disposable food container having a wall caliper of from about 10 to about 50 mils consisting essentially of from about 40 to about 70 percent by weight of a matrix polymer composition consisting predominantly of a polypropylene polymer and including from about 20 to about 40 percent mica, from about 2.5 to about 25 percent by weight calcium carbonate, up to about 5 weight percent titanium dioxide, wherein the calcium carbonate has a mean particle size of about 6 microns, the composition optionally further including a polyethylene polymer.

19. A thermoformed disposable food container having a wall caliper of from about 10 to about 50 mils consisting essentially of from about 40 to about 70 percent by weight of a matrix polymer composition consisting predominantly of a polypropylene polymer and including from about 20 to about 40 percent mica, from about 2.5 to about 25 percent by weight calcium carbonate, up to about 5 weight percent titanium dioxide, wherein the calcium carbonate has a mean particle size of about 3 microns, the composition optionally further including a polyethylene polymer.

20. A thermoformed disposable food container having a wall caliper of from about 10 to about 50 mils consisting essentially of from about 40 to about 70 percent by weight of a matrix polymer composition consisting predominantly of a polypropylene polymer and including from about 20 to about 40 percent mica, from about 2.5 to about 25 percent by weight calcium carbonate, up to about 5 weight percent titanium dioxide, wherein the calcium carbonate has a mean particle size of about 1 micron, the composition optionally further including a polyethylene polymer.

* * * * *

UNITED STATES PATENT AND TRADEMARK OFFICE
CERTIFICATE OF CORRECTION

PATENT NO. : 6,881,937 B2
DATED : April 19, 2005
INVENTOR(S) : Anthony J. Swiontek It is certified that error appears in the above-identified patent and that said Letters Patent is hereby corrected as shown below:

Column 4,
Line 1, insert -- , -- after "Inc.";
Line 21, delete "tester" and insert -- Tester --;
Line 33, delete "particle size" and insert -- "Particle size" --;
Line 42, delete "major component, predominant component" and insert -- "major component", "predominant component" --;
Line 54, delete "Percents" and insert -- "Percents" --;
Line 67, delete "polymer" and insert -- Polymer --.

Column 9,
Line 45, insert -- to -- after "10"; and
Line 51, insert -- , -- after "dioxide".

Signed and Sealed this

Thirtieth Day of August, 2005

JON W. DUDAS
*Director of the United States Patent and Trademark Office*